United States Patent

Hunt

[15] 3,647,342
[45] Mar. 7, 1972

[54] APPARATUS FOR VULCANIZING OPEN END BELTING

[72] Inventor: David G. Hunt, Akron, Ohio
[73] Assignee: The B. F. Goodrich Company, New York, N.Y.
[22] Filed: Jan. 22, 1969
[21] Appl. No.: 793,033

[52] U.S. Cl. ............................. 425/330, 264/236, 425/394
[51] Int. Cl. .................................. B29h 7/22, B29d 29/00
[58] Field of Search .................................. 18/4 B, 6 E, 17 B

[56] References Cited

UNITED STATES PATENTS

| 1,842,646 | 1/1932 | Atkins | 18/17 B |
| 2,327,566 | 8/1943 | Slusher | 18/17 B |
| 2,867,845 | 1/1959 | Sauer | 18/17 B |

FOREIGN PATENTS OR APPLICATIONS

| 1,158,701 | 12/1963 | Germany | 18/17 B |

Primary Examiner—J. Howard Flint, Jr.
Attorney—W. A. Shira, Jr. and Joseph Januszkiewicz

[57] ABSTRACT

Apparatus for curing long lengths of reinforced elastomeric, open end, conveyor belting in a multiple-decked vulcanizing press. The portions of the belt being cured are subjected to substantially uniform stretch prior to closing the press by outrigger rollers over which the belt is trained as it passes continuously from one platen to another. When the portions between the press platens are cured, the belting is advanced longitudinally over the rollers to permit vulcanizing the portions previously extending over the rollers.

4 Claims, 3 Drawing Figures

INVENTOR.
DAVID G. HUNT
BY
ATTY.

APPARATUS FOR VULCANIZING OPEN END BELTING

BACKGROUND OF THE INVENTION

In the present manufacture of large, reinforced elastomeric, conveyor belting, a continuous strip of uncured belting is cured by pressing successive portions between adjacent platens of a flat bed vulcanizing press. The belting is usually clamped across its faces at both ends of the platen and stretched by moving the clamps in a direction away from the platens in the direction of the length of the belting. Where it is desired to cure open end belting in lengths greater than the length of the press platens a portion of the uncured belt equal to the length of the press platens is positioned between the platens, clamped at either end of the platens, stretched between the clamps and then cured by closing the platens thereon. After the platens are reopened, the clamps are released and the belting advanced between the platens an amount equal to the length of the press platens, the clamping and stretching operations are repeated and the platens are again closed upon the belt for curing the newly positioned portion. It is readily apparent that the length of belting that can be cured in this manner in one press cycle is limited by the length of the press platens.

Double deck presses have been built for simultaneously vulcanizing portions of separate belts passing through adjacent stacked pairs of platens. However, this limits multiple use of a single press to belts of identical widths and vulcanizing requirements. Where belts of different widths and/or vulcanizing pressure requirements are to be cured, the second deck of the press is unusable and remains idle. Therefore, multiple deck presses have only provided increased curing capacity where it has been possible to cure more than one identical belt simultaneously. Furthermore, such equipment has required separate stretcher clamps at both ends of each set of platens in order to provide uniform stretch in the belts prior to vulcanizing.

SUMMARY OF THE INVENTION

The present invention provides a means for vulcanizing long lengths of open end elastomeric belting simultaneously in a plurality of spaced portions extending along the length of the belting. This is effected by providing a multiple deck, heated-platen, curing press and training the belting therethrough so that spaced portions are between adjacent press platens and each has a length portion extending beyond the press, intermediate any two platens, corresponding to the length of a platen or "reach" with each of said reaches intermediate two platens passing over a roller that is adjustably mounted in a manner such that the distance between each roller and the press may be changed to provide a predetermined stretch in the belting material. A minimum of three, but preferably four, platens are provided enabling at least two, preferably three, reaches of belting to be cured simultaneously in one press cycle. When vulcanization of the reaches of belting between the platens is completed, the press is opened and the belting is advanced longitudinally an amount to dispose an uncured reach of the belting between each pair of the platens. This is repeated until the entire length of the belting is cured.

The invention thus comprises an apparatus such that several spaced portions of belting may be uniformly stretched and cured simultaneously after which the portions intermediate the previously cured portions are uniformly stretched and then cured. A shortened total curing time and and uniform stretching is thereby provided for the manufacture of belts having lengths much greater than the length of the press platens.

BRIEF DESCRIPTION OF THE DRAWINGS

Referring now to FIG. 1, a curing press of the platen type is shown as having four individually heated platens 10, 11, 12 and 13 adapted to be vertically moved to and from belt-pressing position by hydraulically operated power rams 14, the press being illustrated with the rams in their lower positions so as to apply no pressure on the platens. The platens are guided by posts 15 which provide alignment as the press opens and closes. A rigid beam-frame structure 17 extends between the tops of the posts and is rigidly attached thereto for providing a supporting frame for the press. The press may be of conventional construction and therefore, details of the frame, the means for opening and closing the platens, and the means providing spaces between the platens when the press is open have been omitted from the drawings for clarity.

Figure 1:
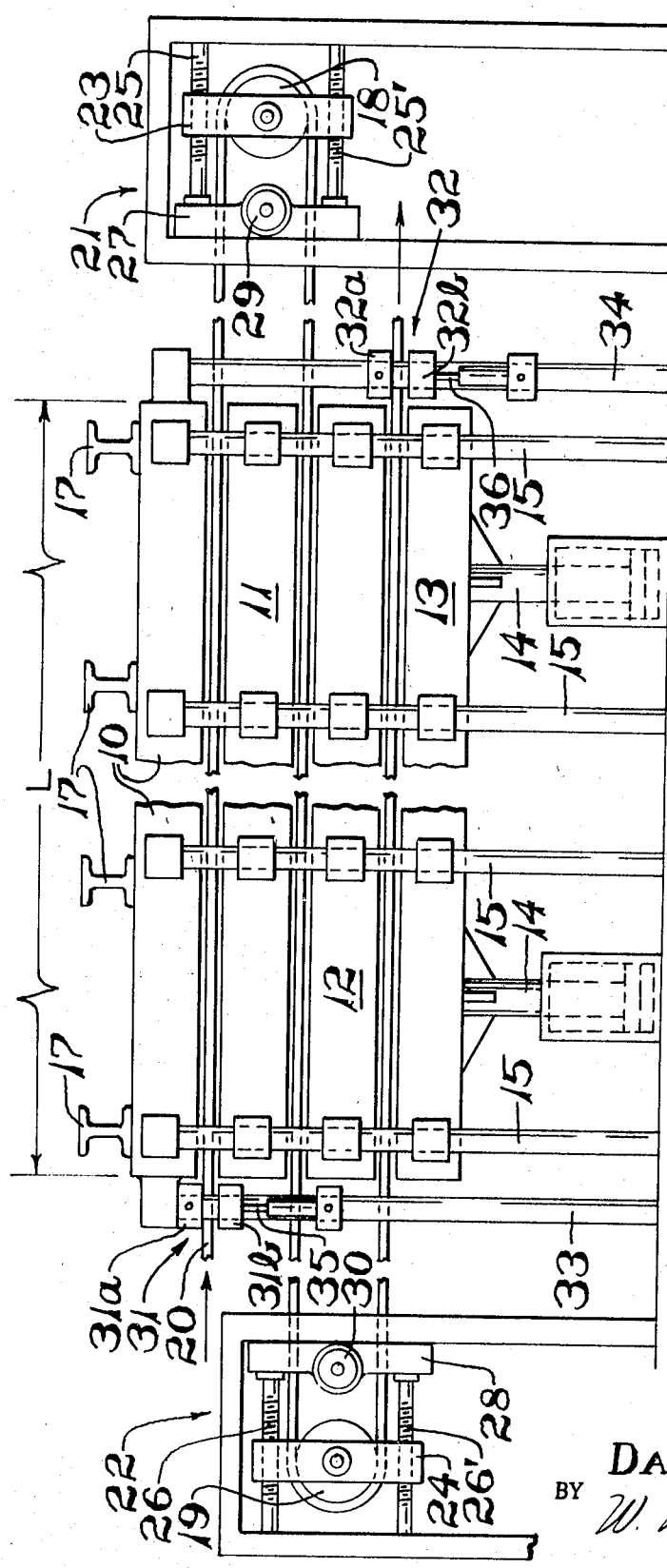
FIG. 1 is a side view of a multiple platen curing press incorporating the invention which press has external belt stretching rollers, the press being illustrated with the platens released to the open position and the belting material positioned for curing.

The preferred embodiment of the invention is illustrated in FIG. 1, wherein the press has four platens which provide three separate curing spaces between adjacent platens. However, if desired, only three platens or more than four platens may be provided, as required for rapid curing of long belts.

In the embodiment of FIG. 1, at least two support rollers 18 and 19 are provided adjacent the edges of the platens in positions such that the rollers are adapted to have the belting material, extending from the space between one pair of adjacent platens, pass over the rollers and return to the space between the next adjacent platens. Referring specifically to FIG. 1, belting material 20 to be cured enters the press between platens 10 and 11, as indicated by the arrow, and extends continuously therethrough outwardly from the opposite end of the press over the roller 18, spaced opposite the second platen 11. From the roller 18 the belting turns to pass between the second and third platens 11 and 12 with the belting extending continuously therethrough and outwardly of the press where it extends over roller 19 which is aligned opposite the third platen 12. The belting then returns to the press, passing continuously through the space between platens 12 and 13, and outwardly therefrom as indicated by a second arrow.

It will be apparent from the foregoing description that the support rollers 18 and 19 are spaced alternately on opposite sides of the press from the edges of adjacent platens 11 and 12. The rollers 18 and 19 are mounted on frame means 21 and 22, respectively, and each is free to rotate about its axis. The frame means 21 and 22 each have a yoke 23 and 24, respectively, mounted on pairs of parallel rotatable threaded jack-screws 25, 25' and 26, 26', which yokes are in threaded engagement with the screws such that rotation of the latter produces axial movement thereon of the yokes 23 and 24. Each of the pairs of jack-screws 25, 25' and 26, 26' has adjacent ends of the individual screws operatively connected to a means, 27 and 28 respectively, for simultaneously rotating both of the jack-screws in each of the pairs. The means for rotating the jack-screws comprises respectively, a gear transmission 27 and 28 which may be of conventional construction. Power means 29 and 30, respectively, are provided for driving each of the gear transmissions 27 and 28 which means are preferably reversible motors having the rotating shaft of one of the motors operatively connected respectively to each of the transmissions 27 and 28. By reversing the direction of rotation of the motors 29 and 30, the rotation of the jack-screws 25, 25' and 26, 26' is reversed and the yokes 23 and 24, respectively and rollers 18 and 19 are caused to move away from or toward the press, as is desired, for increasing or decreasing the amount of stretch in the belting 20.

A clamp 31 is provided at the entrance of the belting to the space between the first and second platens 10 and 11 and a separate clamp 32 is provided as the belt exits finally from between the space between the third and fourth platens 12 and 13. Clamps 31 and 32 are tightened to prevent motion of the belt relative to the press platens.

The clamps may be of conventional construction. As illustrated in FIG. 1, each of the clamps 31 and 32 has its upper half, 31a and 32a, respectively, attached to the end portions of beam-frame 17 of the press. The lower half 31b and 32b respectively, of each clamp is slidably supported on pairs of vertical posts 33 and 34, respectively. Each of the clamp halves 31b and 32b has actuator means 35 and 36, respectively, attached thereto for opening and closing the clamp. In the embodiment of FIG. 1 the actuator means 35 and 36 each comprises a hydraulic power cylinder having one end attached preferably to the floor, or in the alternative to any convenient portion of the rigid structure of the press, as for example, the posts 15 or the frame 17, and the operating piston connected to the lower half of each clamp 31b and 32b respectively. Actuating the means 35 and 36 respectively, raises the lower half 31b and 32b of each of the clamps 31 and 32 thus securing the belting between the upper and lower halves of the clamps.

In operation, the clamps are tightened with the platens in the open position. The motor means 29 and 30 are then energized to move support rollers 18 and 19 outwardly from the press, thereby stretching the clamped length of the belt to a desired amount, and the press rams 14 are then raised closing the platens after which the motor means 29 and 30 may be operated in the reverse direction in preparation for movement of the belting following the curing which is effected under pressure.

Figure 2:
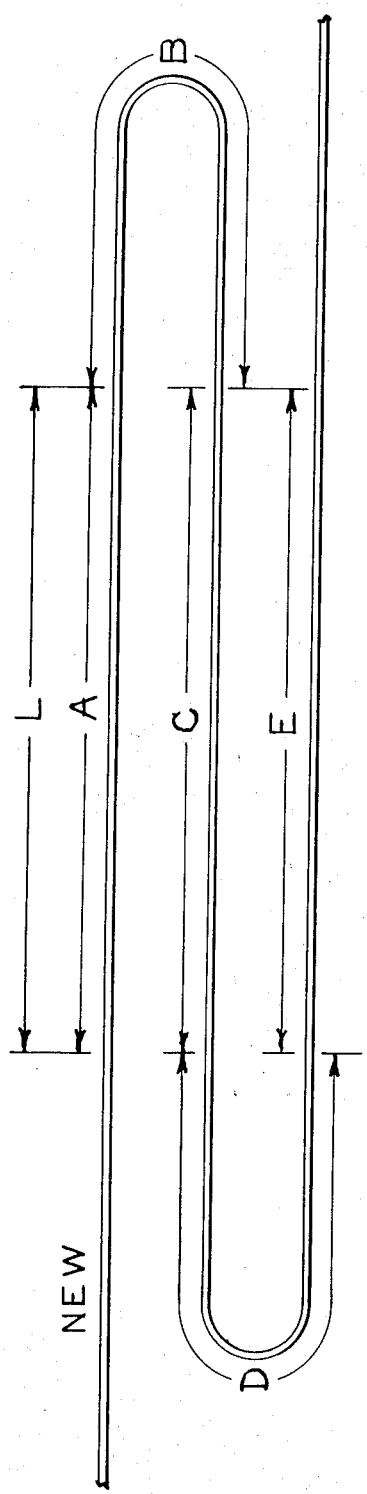
FIG. 2 is a schematic view of the belting in the initial position between the press platens before the first stage of vulcanizing.
Figure 3:
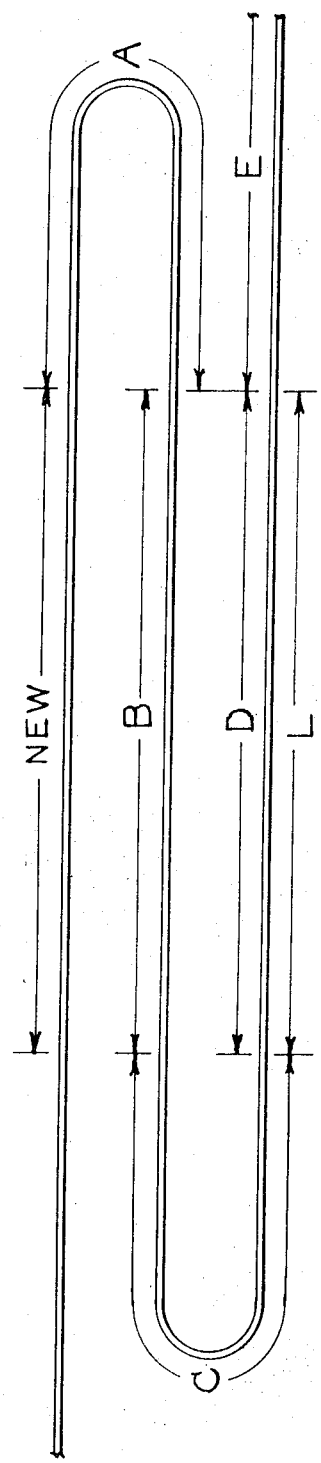
FIG. 3 is a view similar to FIG. 2 showing the belt in position to which it is advanced prior to the second stage of vulcanizing.

Referring now to FIGS. 2 and 3, when the portions of the belt initially positioned between platens 10, 11, 12, and 13, denoted in the drawings by letters A, C, and E, have been vulcanized, press rams 14 are lowered and the platens released. Clamps 31 and 32 are then released and the belting is advanced over the support rollers an amount equal to the length "L" of the press platens which positions the now cured portions A, C, and E, outwardly of the platens as shown in FIG. 3. The not-yet-cured portions denoted as NEW, B and D in FIG. 3 are thus positioned each respectively between a pair of platens for curing. The clamps are again closed, the motor means 29 and 30 actuated to stretch the clamped portion, and the platens closed to cure the portions of belting therebetween. When the latter portions, NEW, B and D, have been cured, the belting must then be advanced an amount such that all vulcanized portions have passed through the last pair of platens and outwardly of the press. The entire curing procedure may then be repeated if desired for additional belt lengths, or the cured belting may be cut from the strip of uncured belting.

It will be apparent that it is desirable to space the support rollers 18 and 19 a distance away from the platens such that a length of belting passing over the rollers outside of the press is equal to one length "L" or reach of the press platens. Thus, in the preferred form of the invention, after curing of the initial portion of the belting and releasing the platens, the belting need be advanced only one press reach "L" in order to place the uncured portions of the belt B and D intermediate the previously cured portions plus the portion labeled NEW in the drawings in position for curing.

If it is desired to cure lengths of belting greater in number than can be accommodated in a two stage curing cycle by the platens in the press, the entire cured portions of belting may be advanced through the press when the second phase of the curing has been completed, and a new two stage curing procedure repeated. In the alternative, any desired length of belt may be cured in two stages by providing a sufficient number of platens and supporting rollers.

The invention is capable of modification and further adaptations by those having ordinary skill in the art and is more particularly defined by the appended claims.

I claim:

1. Apparatus for curing open-end elastomeric belting comprising:
   a. a vulcanizing press having at least three vertically aligned heated curing platens movable to and from material engaging positions;
   b. stationary clamping means spaced closely adjacent said press at positions where belting material enters and finally exits from the press, the said clamping means being operable from and to clamping positions with respect to the belting such that longitudinal movement of the clamped portions of belting with respect to said platens is prevented;
   c. belting support means disposed intermediate said clamping means, which support means are adapted to have a single length of belting extend thereover from between one adjacent pair of platens and reverse direction of the belting for passing between one of said pair of platens and another of the adjacent platens; and
   d. means to move said support means relative to said platens to thereby subject the portions of the belting intermediate said clamping means to a predetermined amount of stretch.

2. The apparatus defined in claim 1, wherein said support means are rollers.

3. The apparatus defined in claim 2, wherein each of said rollers is rotatably mounted in bearing means and guided for horizontal movement relative to said platens and the said means for moving said rollers comprises motion producing means attached to said bearings.

4. Apparatus for curing open-end elastomeric belting comprising:
   a. a vulcanizing press having at least four vertically aligned heated curing platens movable to and from material engaging positions;
   b. a pair of stationary clamps each spaced closely adjacent said press one at the position where belting material initially enters and the other where belting material finally exits from the press, the said clamps being operable to and from clamping positions with respect to the belting such that longitudinal movement of the clamped portions of belting with respect to said platens is prevented;
   c. a plurality of adjustable belt supporting rollers disposed alternately on opposite sides of said press intermediate said clamps which rollers are adapted to have belting extend thereover from between adjacent pairs of platens and reverse direction of the belting for passing between pairs of adjacent platens; and,
   d. means operatively connected to each of said rollers for moving same relative to said platens thereby stretching the portions of the belting intermediate said clamps a predetermined amount.

* * * * *